United States Patent
Hansson et al.

(10) Patent No.: US 7,525,037 B2
(45) Date of Patent: Apr. 28, 2009

(54) SYSTEM AND METHOD FOR AUTOMATICALLY BEAT MIXING A PLURALITY OF SONGS USING AN ELECTRONIC EQUIPMENT

(75) Inventors: Emil Hansson, Tokyo (JP); Jonas M. Andersson, Tokyo (JP)

(73) Assignee: Sony Ericsson Mobile Communications AB, Lund (SE)

( * ) Notice: Subject to any disclaimer, the term of this patent is extended or adjusted under 35 U.S.C. 154(b) by 6 days.

(21) Appl. No.: 11/774,099

(22) Filed: Jul. 6, 2007

(65) Prior Publication Data

US 2008/0314232 A1    Dec. 25, 2008

Related U.S. Application Data

(60) Provisional application No. 60/946,088, filed on Jun. 25, 2007.

(51) Int. Cl.
    *G10H 1/00*          (2006.01)
    *G10H 1/18*          (2006.01)

(52) U.S. Cl. ............................. 84/615; 84/609; 84/622; 84/625; 84/649; 84/653; 84/659; 84/660

(58) Field of Classification Search ........................ None
See application file for complete search history.

(56) References Cited

U.S. PATENT DOCUMENTS

| | | | |
|---|---|---|---|
| 5,663,517 A * | 9/1997 | Oppenheim | .................. 84/649 |
| 6,066,792 A | 5/2000 | Sone | |
| 6,307,141 B1 | 10/2001 | Laroche et al. | |
| 6,344,607 B2 | 2/2002 | Cliff | |
| 6,888,999 B2 * | 5/2005 | Herberger et al. | ............. 386/65 |
| 6,933,432 B2 * | 8/2005 | Shteyn et al. | ................. 84/609 |

(Continued)

FOREIGN PATENT DOCUMENTS

GB      2 365 616      2/2002

OTHER PUBLICATIONS

International Search Report and Written Opinion for International Application No. PCT/IB2007/004025 dated May 16, 2008.

*Primary Examiner*—Marlon T Fletcher
(74) *Attorney, Agent, or Firm*—Renner, Otto, Boiselle & Sklar, LLP (57) ABSTRACT

A method, device and application for combining one or more multimedia content sources (e.g., songs) together and rendering the composite output to a user in a user sensible format that is audibly pleasing to the user through a player. A first multimedia content source and a second multimedia content source is selected. An analysis is made of the sources to find at least one candidate from each source to mix together. At least one candidate from each source is selected. The beat length associated with each the selected candidate is set and adjusted, if necessary. A fade mixing profile is selected. The fade mix profile adjusts a volume parameter associated with the selected candidate from each source over a transition period of time. The selected candidate from each source together is mixed according to the fade mixing profile to transition over the transition period time between the first multimedia content source and the second multimedia content source to form a beat mix transition. The beat mix transition is rendered between the first multimedia content source and the second multimedia content source.

14 Claims, 11 Drawing Sheets

U.S. PATENT DOCUMENTS

| | | |
|---|---|---|
| 7,220,911 B2 | 5/2007 | Basu |
| 7,319,185 B1 * | 1/2008 | Wieder ........................ 84/609 |
| 2001/0039872 A1 | 11/2001 | Cliff |
| 2002/0157522 A1 | 10/2002 | Cliff |
| 2002/0166440 A1 * | 11/2002 | Herberger et al. .............. 84/625 |
| 2003/0183064 A1 * | 10/2003 | Eugene et al. ................ 84/609 |
| 2007/0261534 A1 * | 11/2007 | Allen .......................... 84/603 |
| 2007/0261537 A1 * | 11/2007 | Eronen et al. ................. 84/611 |

* cited by examiner

SYSTEM AND METHOD FOR AUTOMATICALLY BEAT MIXING A PLURALITY OF SONGS USING AN ELECTRONIC EQUIPMENT

RELATED APPLICATION DATA

The present application claims the benefit of U.S. Provisional Application Ser. No. 60/946,088, filed Jun. 25, 2007, the disclosure of which is herein incorporated by reference in its entirety.

TECHNICAL FIELD OF THE INVENTION

The present invention relates generally to electronic equipment for rendering audio signals, and more particularly, to a system and method for combining one or more portions songs and/or other multimedia content together and rendering the composite song and/or multimedia content to a user in a user sensible format.

DESCRIPTION OF RELATED ART

Electronic equipment (e.g., audio players, MP3 players, CD-players, etc.) currently on the market are used in a very traditional way. They generally are used to only play back pre-recorded songs and/or other multimedia content. The actual differences from a standard CD-player from the 1990's are few. Generally, the players play or otherwise render the songs from the beginning to the end. In some players, the user is provided with a feature to let the player fade out the ending of a song while the beginning of the next one is faded in. While such a feature may provide audibly pleasing audio in some exceptional cases, generally the transition between the first song and the second song is not generally audibly pleasing.

Dance clubs and radio stations generally avoid this problem by having a disc jockey playing music to an audience. The disc jockey has the capability of selecting the right music that will please a particular audience. The disc jockey also has the ability to play the selected music and mix it in a way that sounds good to the audience based on the disc jockey's experience.

SUMMARY

In view of the foregoing, a need exists for an audio player application installed in an electronic equipment to automatically combine or mix one or more sources (e.g., songs or other multimedia content) together to produce a transition or overlap period between the end of one song and the beginning of another song. The transition or overlap period may be customizable based on a variety of factors, including user preferences.

One aspect of the invention relates to a method for transitioning from a first multimedia source to a second multimedia content for output to a user, the method comprising: selecting a first multimedia content source and a second multimedia content source, wherein the first multimedia content source and the second multimedia content source is digitally encoded; analyzing the first multimedia content source and the second multimedia content source to find at least one candidate from each source to mix together to form a transition between the first multimedia source and the second multimedia source; selecting at least one candidate from each source; determine a beat length associated with the selected candidate from each source; adjusting the beat length of the selected candidate from each source so that the beat length for each candidate is of substantially equal length; selecting a fade mixing profile by adjusting a volume parameter associated with the selected candidate from each source over a transition period of time; mixing the selected candidate from each source together according to the fade mixing profile to transition over the transition period time between the first multimedia content source and the second multimedia content source to form a beat mix transition; and rendering the beat mix transition between the first multimedia content source and the second multimedia content source.

According to an aspect of the invention, the of step analyzing the first and second multimedia content sources to find at least one candidate from each source includes determining a preferred song length for selecting the at least one candidate.

According to an aspect of the invention, when at least one of the first or second source includes multiple candidates, each candidate from the first source is analyzed with each candidate of the second source.

According to an aspect of the invention, a score is determined for each of the multiple candidates based upon the topography of each of the multiple candidates.

According to an aspect of the invention, selecting candidate from each source is based upon the score for each of the multiple candidates.

According to an aspect of the invention, the step of adjusting the beat length includes truncating the beat length of the at least one candidate from the first or second source having a longer beat length.

According to an aspect of the invention, the step of adjusting the beat length includes looping at least a portion of the beat length of the at least one candidate from the first or second source having a shorter beat length.

According to an aspect of the invention, the step of analyzing includes determining if there are overlapping vocals for each candidate from each source.

According to an aspect of the invention, the step of analyzing includes determining if there is a matching beat pattern exists for each candidate from each source.

According to an aspect of the invention, the step of analyzing includes determining if there is a matching key for each candidate from each source.

According to an aspect of the invention, the step of analyzing includes determining if there is a matching length in bars for each candidate from each source.

According to an aspect of the invention, the step of analyzing includes one or more user customizable parameters to determine a suitable combination of candidates from the first source and the second source.

According to an aspect of the invention, a mobile telephone renders the beat mix transition between the first multimedia content source and the second multimedia content source through a speaker.

According to an aspect of the invention, the beat mix transition includes one or more effects that simulate a live disc jockey playing conventional records on a turntable.

Another aspect of the invention relates to a portable communication device comprising: a memory; and a controller coupled to the memory, wherein when the controller executes a disc jockey application program stored on a machine-readable medium, wherein when the disc jockey application program is loaded in memory and executed causes the portable communication device to: select a first multimedia content source and a second multimedia content source; analyze the first multimedia content source and the second multimedia content source to find at least one candidate from each source to mix together to form a transition between the first multimedia source and the second multimedia source; selecting at least one candidate from each source based upon a combined topography associate with the selected candidates from each source; selecting a fade mixing profile stored in the memory; mixing the selected candidate from each source together to transition over the transition period time between the first multimedia content source and the second multimedia content source to form a beat mix transition according to the fade mixing profile; and rendering the beat mix transition between the first multimedia content source and the second multimedia content source through a player application stored on the portable communications device.

Another aspect of the invention relates to a user profile associated with the disc jockey application stores one or more user preferences for analyzing the multimedia content sources and selecting the fade mixing profile in the memory.

According to an aspect of the invention further includes determining a beat length associated with the selected candidate from each source and adjusting the beat length of the selected candidate from each source so that the beat length for each candidate is of substantially equal length.

According to an aspect of the invention, the step of adjusting the beat length includes truncating the beat length of the at least one candidate from the first or second source having a longer beat length.

According to an aspect of the invention, the step of adjusting the beat length includes looping at least a portion of the beat length of the at least one candidate from the first or second source having a shorter beat length.

Another aspect of the invention relates to a computer program stored on a machine readable medium comprising, the program being suitable for use in an electronic equipment as a disk jockey application wherein, the disk jockey application determines a beat mix transition that is rendered between a first source and second source, wherein the beat mix transition includes at least a portion of the first source and the second source and the beat mix transition is selected based upon a topographical analysis of one or more portion of the first source and the second source.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form. The present invention will now be described with reference to the drawings, wherein like reference numerals are used to refer to like elements throughout.

The present invention relates generally to electronic equipment for combining one or more multimedia content sources (e.g., songs) together and rendering the composite output to a user in a user sensible format that is audibly pleasing to the user.

Figure 1:
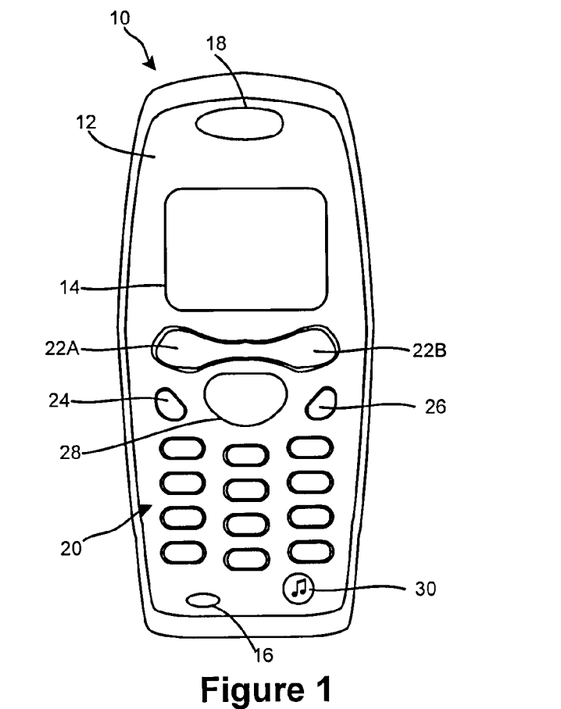
FIG. 1 is a diagrammatic illustration of a portable communication device in accordance with aspects of the technology.

Referring initially to FIG. 1, an electronic device 10 is shown in accordance with an exemplary embodiment of the present invention. In the exemplary embodiment, the electronic device 10 is a mobile phone for carrying out mobile communications including voice communications, etc. In addition to operating as a mobile phone, the electronic device 10 also may function as a portable music player (e.g., an MP-3 player) for audibly rendering music to a user and as an electronic disc jockey for mixing together multimedia content in a manner that is audibly pleasing to an associated user. While the present invention is described herein in the context of the electronic device 10 being a mobile phone, it will be appreciated that the electronic device 10 may be any type of electronic device that is capable of rendering music to one or more users (e.g., a personal digital assistant (PDA), a personal media player, an alarm clock, a portable global positioning system, a satellite radio, etc.). The particular type of electronic device is not germane to the present invention.

As is shown in FIG. 1, the exemplary embodiment of the mobile telephone 10 includes a housing 12 that allows the user to easily handle the mobile telephone 10. While the mobile telephone 10 is shown as having a "brick" or "block" design type housing 12, it will be appreciated that other type housings, such as a clamshell housing or a slide-type housing, may be utilized without departing from the scope of the invention.

The housing 12 includes an opening for receiving a display 14 (e.g., a liquid crystal display). The display 14 serves as a graphical user interface (GUI). The display 14 provides a display of various types of information to the user as is conventional. For example, the display 14 may present the operational status of the mobile telephone 10, contact information, menu information, text, graphics, images, videos, etc. When the mobile telephone 10 is utilized as a music player as described herein, the display 14 may list one or more of the multimedia content files (e.g., songs, segments of songs, segments of multimedia content, etc.) currently being output by the music player and/or available to the user for selection. When the mobile telephone 10 is executing the disc jockey application, as a music player as described herein, the display 14 may list one or more of the multimedia content files (e.g., songs, segments of songs, segments of multimedia content, etc.) currently being analyzed, user preferences, user desired effects and/or effects and options available to the user for selection. In addition, in the case where the display 14 is a touch sensitive display, the display 14 may serve as an input device to allow the user to input data, menu selections, etc.

The mobile telephone 10 further includes a microphone 16 and a speaker 18. As is conventional, the microphone 16 and speaker 18 allow a user to carry out conventional voice communications by placing the mobile telephone 10 adjacent the user's ear and mouth. In addition, the speaker 18 also may render audible signals generated from one or more application programs and/or hardware (e.g., music player, alarms, etc.) associated with the mobile telephone 10 in a user sensible format to one or more associated users.

In addition, the mobile telephone 10 includes a keypad 20 having an assortment of keys. The keypad 20 facilitates user input and operation of the mobile telephone 10 as is conventional. For example, the keypad 20 may include keys for navigating the menus displayed on the display 14, selecting predefined functions such as audio playback operation, mixing audio files, initiating or terminating a call, etc.

The mobile telephone 10 also may include other keys or buttons useful in the operation of the mobile telephone 10. For example, the mobile telephone 10 may include volume keys 22a and 22b mounted to the housing 12 that allow the volume of the speaker 18 to be adjusted during use of the mobile telephone 10 as a telephone, a media player and/or a disk jockey application. In addition, the mobile telephone 10 may include a button 24 that allows a user to answer or "pick up" an incoming call simply by pressing the button 24. Likewise, the mobile telephone 10 may include a button 26 that allows a user to "hang up" or otherwise terminate a completed call and/or application simply by pressing the button 26.

In addition, the mobile telephone 10 may further include a navigation tool 28 to allow the user to conveniently navigate through the GUI presented on the display 14. The mobile telephone 10 also may include key 30 to allow the user to initiate a music player application associated with the mobile telephone 10 and/or a disc jockey application. By simply pressing the key 28, the music player application and/or the disc jockey application may be initiated. One of ordinary skill in the art will readily appreciate that other mechanisms (e.g., selecting an application from a menu displayed on the display, selecting a different key, etc.) may be used to initiate the music player and/or the disc jockey application.

Figure 2:
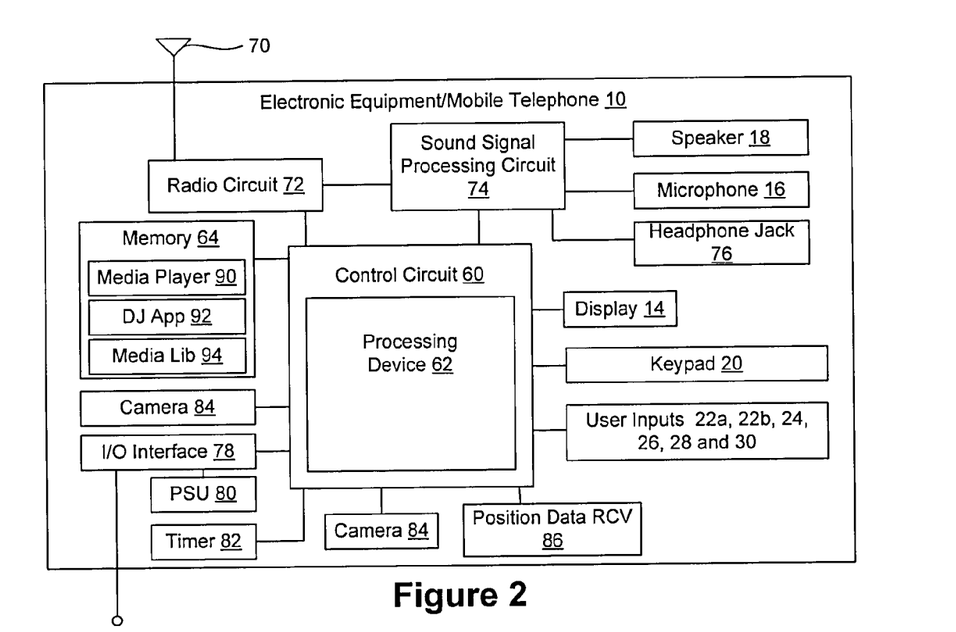
FIG. 2 is a functional illustration of a portable communication device in accordance with aspects of the technology.

Referring to FIG. 2, a functional block diagram of the mobile telephone 10 is illustrated. The mobile telephone 10 includes a primary control circuit 60 that is configured to carry out overall control of the functions and operations of the mobile telephone 10. The control circuit 60 may include a processing device 62, such as a CPU, microcontroller or microprocessor. The processing device 62 executes code stored in a memory (not shown) within the control circuit 60 and/or in a separate memory, such as memory 64, in order to carry out conventional operation of the mobile telephone 10. The memory 64 may be, for example, a buffer, a flash memory, a hard drive, a removable media, a volatile memory, a non-volatile memory and/or a combination of any of the above. In addition, the processing device 62 executes code to carry out various functions of the mobile telephone 10.

Continuing to refer to FIGS. 1 and 2, the mobile telephone 10 includes an antenna 70 coupled to a radio circuit 72. The radio circuit 72 includes a radio frequency transmitter and receiver for transmitting and receiving signals via the antenna 70 as is conventional. The mobile telephone 10 further includes a sound signal processing circuit 74 for processing the audio signal transmitted by/received from the radio circuit 72. Coupled to the sound processing circuit 74 are the speaker 18 and a microphone 16 that enable a user to listen and speak via the mobile telephone 10 as is conventional. The radio circuit 72 and sound processing circuit 74 are each coupled to the control circuit 60 so as to carry out overall operation. The sound processing circuit 74 may also process multimedia content (e.g., songs) from the media player 90 and the disc jockey application 92 and render the multimedia content to the user in a user a sensible format through the speaker 18 and/or a head set (not shown).

The mobile telephone 10 also includes the aforementioned display 14 and keypad 20, as well as keys 22A, 22B, 24, 26, 30 and navigation tool 28 coupled to the control circuit 60. The mobile telephone 10 further includes an I/O interface 78. The I/O interface 78 may be in the form of typical mobile telephone I/O interfaces, such as a multi-element connector at the base of the mobile telephone 10. As is typical, the I/O interface 78 may be used to couple the mobile telephone 10 to a battery charger to charge a power supply unit (PSU) 80 within the mobile telephone 10. In addition, or in the alternative, the I/O interface 78 may serve to connect the mobile telephone 10 to a wired personal hands-free adaptor, to a personal computer or other device via a data cable, etc. The mobile telephone 10 may also include a timer 82 for carrying out timing functions. Such functions may include timing the durations of calls, generating the content of time and date stamps, etc.

The mobile telephone 10 may include various built-in accessories, such as a camera 84 for taking digital pictures and/or video clips. In one embodiment, the mobile telephone 10 also may include a position data receiver 86, such as a global positioning satellite (GPS) receiver, Galileo satellite system receiver or the like.

The mobile telephone 10 includes a multimedia content player application 90 stored in memory 64. The multimedia content player 90 is hardware or software for playing audio files encoded using one or more encoding formats (e.g., MP3, AIFF, WAV, MPEG-4, AAC, and Apple Lossless). The mobile telephone 10 may further include a disc jockey (DJ) application 92 and a library 94. The multimedia content player application 90, the DJ application 92 and library 94 may be stored in memory 64, on an external memory card and/or on a hard disk drive associated with the mobile telephone 10. In addition, the multimedia content player application 90, the DJ application 92 and library 94 may be stored on a remote storage device (e.g., hard disk, memory). Such a remote storage device may be a personal computer, server, external memory, etc.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the DJ application 92 is executed by the processing device 62 in accordance with the preferred embodiment of the invention, such functionality could also be carried out via dedicated hardware, firmware, software, or combinations thereof, without departing from the scope of the invention.

The multimedia content player application 90 is a software application for playing back multimedia files to a user through the sound signal processing circuit 74 and the speaker 18. The multimedia content player application 90 may be a media player for playing back digital audio, including optical discs such as CDs, SACDs, DVD-Audio, HDCD, and audio files. The multimedia content player application 90 generally supports an array of media formats, as discussed above. Some media players focus only on audio or video and are known as audio players and video players respectively. While aspects of the present invention are directed to audio players, one of ordinary skill in the art will appreciate that aspects of the present invention are also suitable to video players. Exemplary multimedia content players include: Windows Media Player, Real, iTunes, Quicktime Player VLC, MPlayer, xine, Totem, etc.

The multimedia content player application 90 may output media files to a user in a user-sensible manner as is conventional. In addition, the multimedia content player 90 may play media composed, combined and/or modified by the DJ application 92.

Operation of the DJ application 92 will now be described. The DJ application 92 provides a method for mixing multimedia content segments for output to a user in a user sensible format. An exemplary method 100 is illustrated in FIG. 3.

Figure 3:
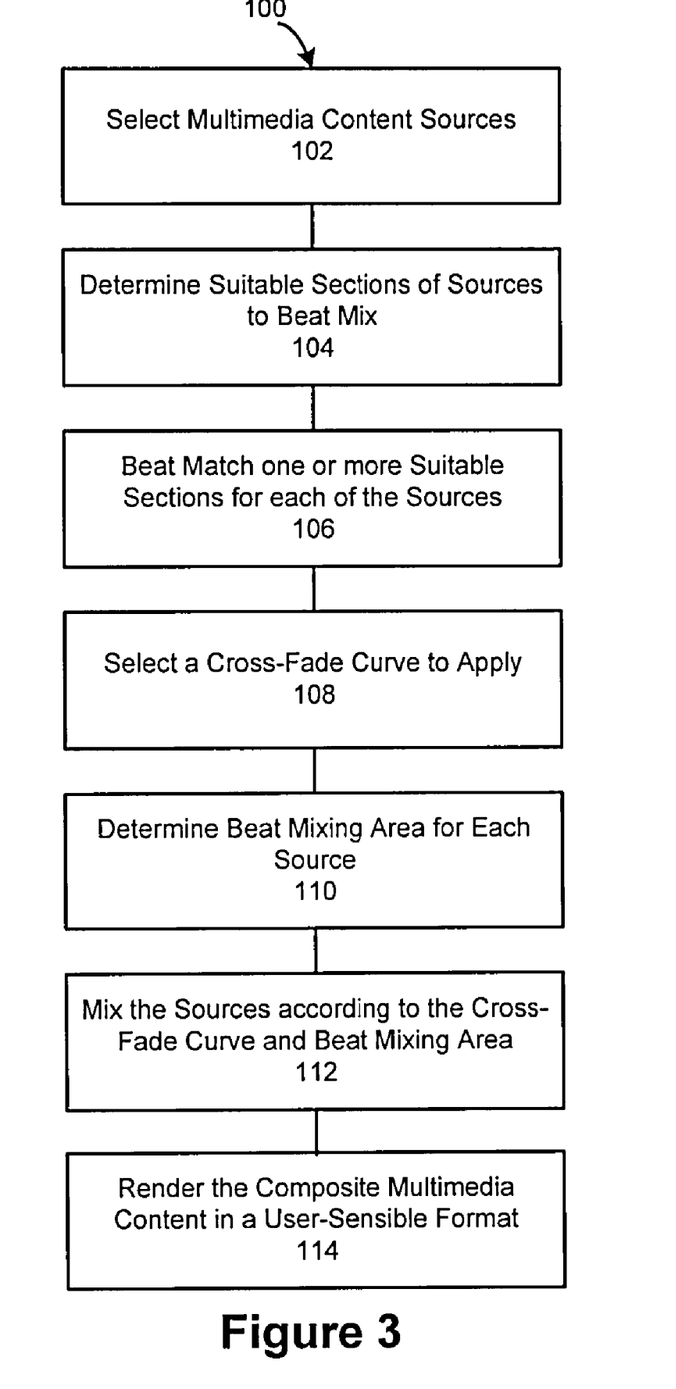
FIG. 3 is an exemplary method in accordance with aspects of the technology.

Referring to FIG. 3, at block 102, DJ application 92 allows the user to select two multimedia content sources (e.g., songs, jingles, etc.). Alternatively, the DJ application 92 automatically selects one or both multimedia content sources based on user preferences, intended audience and/or any or desirable selection criteria. Generally, the first multimedia content source and the second multimedia content source are digitally encoded and stored in memory and/or hard disk. In addition, the multimedia content sources may be stored and/or otherwise indexed or made available through the library 94 and/or DJ application 92.

Once the multimedia content sources are selected, the DJ application 92 determines the most suitable parts in the sources for beat mixing together, at block 104. The most suitable parts for beat mixing together may be referred to herein as the "beat mixing area". Any part of the sources may be used for the beat mixing area. But there are certain criteria for determining a suitable beat mixing area that yields audibly pleasing results. Generally, a starting point for a suitable mixing area is after a chorus section without vocals in both sources. In one embodiment, the beat mixing area contains only a beat section with little instrumentation.

At block 106, generally prior to the sources being mixed together, the sources are "beat matched". As used herein, the phrase "beat matched" or "beat match" refers substantially matching the tempo of the selected content sources. For instance, if the first content source (content source first output to the user) has a tempo of 127 beats per minute (BPM) and the second content source is to be played at 130 BPM, then the second content source is adjusted in pitch (the tune will vary with the speed adjustment) or by changing the master tempo (digital music's tempo can be adjusted by either stretching or shrinking the waveform, which generally don not affect the tune. The tempo (BPM) for the selected areas are retrieved from the audio topography metadata and used as an input for the beat matching.

Figure 4:
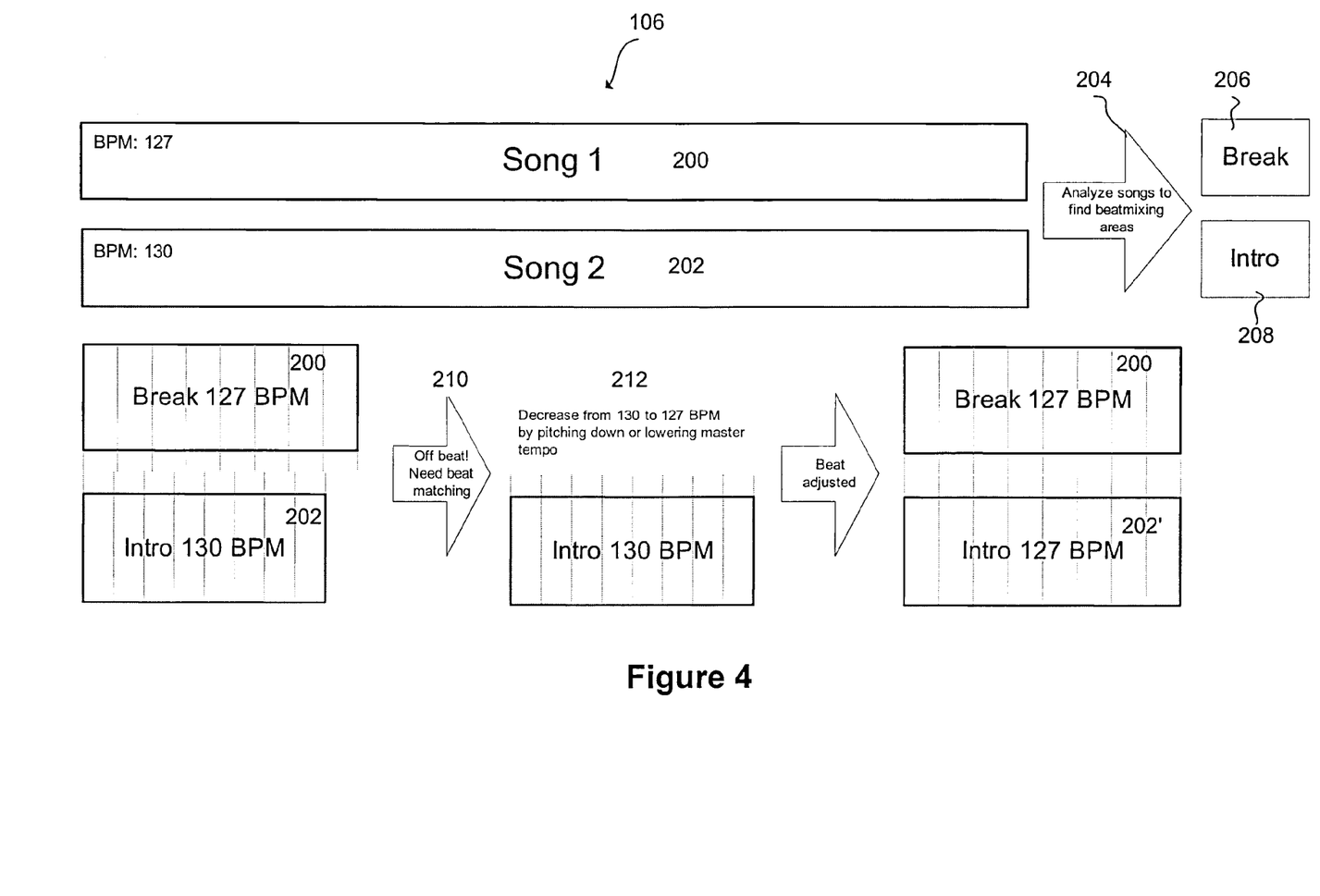
FIG. 4 is an exemplary method in accordance with aspects of the technology.

Step 106 is illustrated in detail in FIG. 4. In FIG. 4, the multimedia content sources are identified as songs 200 and 202. The songs are analyzed at step 204 to find one or more appropriate beat mixing areas. A "break" area 206 is selected in the first song 200. The break area may be any desirable portion of the first song 200 that is selected to be mixed. In addition, an "intro" area 208 is selected from the second song 202. The intro area may be any desirable portion of the second song 202 that is selected to be mixed. The tempo associated with the break area is 127 BPM and the intro area is 130 BPM, as shown at 210. At 212, the intro area having a 130 BPM is adjusted by decreasing the beats per minute from 130 to 127. This may be accomplished by pitching down or lower the master tempo, which yields 202', a portion of 202 with a modified pitch or tempo to match the pitch or tempo of the first source.

Figure 5A:
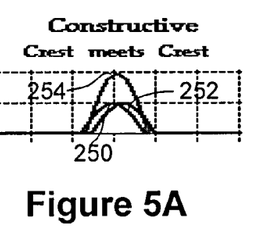
FIGS. 5A, 5B and 5C are exemplary graphs of exemplary super positioning effects.
Figure 5B:
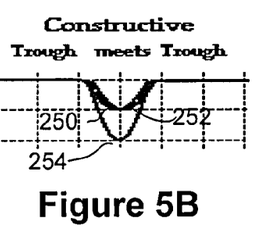
Figure 5C:
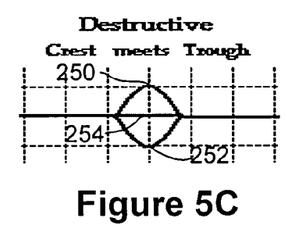

Referring back to FIG. 3, at step 108, a cross-fade curve is selected. The curve may be selected manually by a user, by the DJ application based on one or more user profiles, or any other desired manner. A determination is made on how to cross-fade the main volume and/or one more other audio components associated with the selected sources (e.g., treble, midrange, bass, etc.). Depending on the sum of the topography of the selected mixing areas, several unwanted effects (e.g., super positioning of the beats when in synchronization) may occur as shown in FIG. 5A-5C. Such unwanted effects may include constructive interference where the crest from the first source 250 meets the crest from the second source 252 resulting in a beat 254 that will sound much stronger than desired, as shown in FIG. 5A. Referring FIG. 5B, constructive interference also may occur when the through from one the first source 250 meets the trough from the second source 252, which may also result in a beat that will sound much stronger than desired 254. Referring to FIG. 5C, undesirable destructive interference also may occur when the crest from one source 250 meets the trough of the second source 252. Such destructive interference may lead to a sound that is much weaker than desired 254.

As stated above, a super positioning of the beat may make the beat sound much stronger (or weaker) during the actual beat mix. In such cases, the beat will sound unnatural and the wanted smoothness of the mixing will be lost. Accordingly, when the DJ application 92 detects a super positioning event, the bass may be adjusted so that the sum of the bass signals from the first and second source generally will not exceed the level of the individual beats. One of ordinary skill in the art will readily appreciate that another parameter may also be adjusted (e.g., treble, volume, etc.).

Figure 6A:
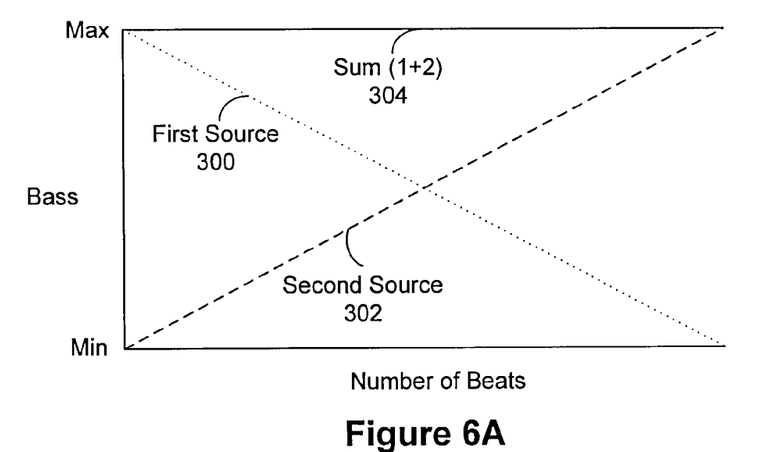
FIGS. 6A, 6B and 6C are exemplary graphs of fading curves based on Bass of the associated sources in accordance with aspects of the technology.
Figure 6B:
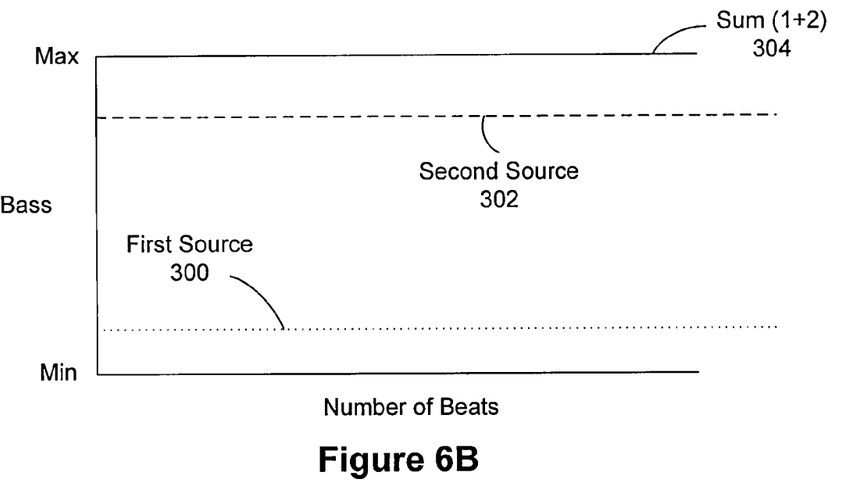
Figure 6C:
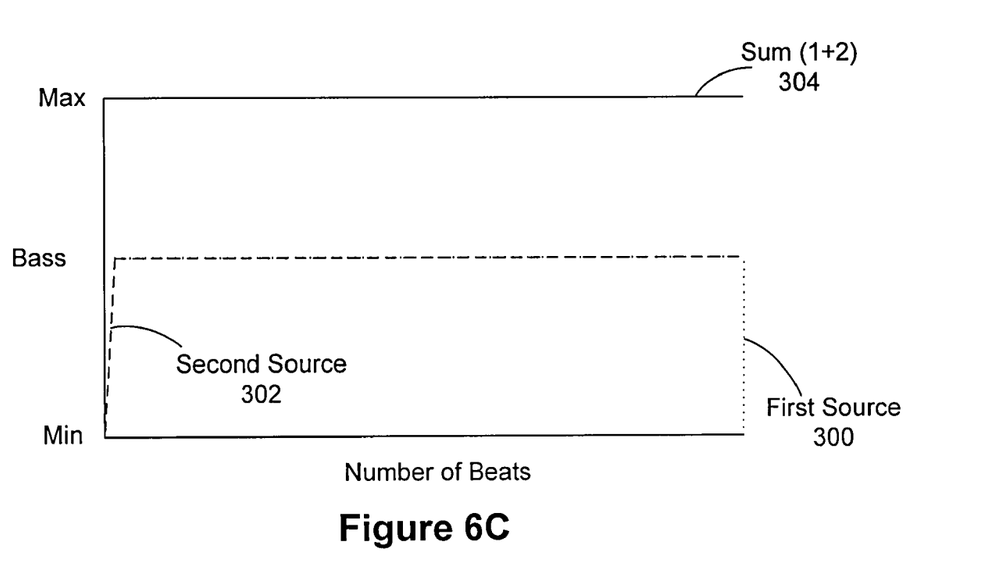

Various cross-fade curves associated with the bass parameter for the first and second sources are illustrated in FIGS. 6A-6C. As shown in FIG. 6A, a physical property (e.g., bass) associated with the first sources (reference numeral 300) and the second source (reference numeral 302) vary over a range of beats (e.g., a transition period also referred to herein as beat mix period) for a minimum and a maximum value associated with the physical property. The sum of the channels is substantially at the maximum value, denoted by 304 over the entire number of beats. Likewise, referring to FIG. 6B, the physical parameter is substantially constant over the number of beats for the first source 300 and the second source 302. The sum of the signals denoted by reference numeral 304 is substantially constant over the number of beats. Referring to FIG. 6C, the cross-fade pattern illustrates applying the second source 302 to the first source 300, wherein the sources have substantially the same value for the physical parameter. At the end of the number of beats associated with the fade (e.g., beat mix period, transition period), output from the first source is terminated. The output of the sum of the signals is substantially double the source signals for FIG. 6C. As stated above, this concept may be applied to any desired physical parameter. Suitable physical parameters include a bass parameter, a volume parameter, a treble parameter, etc.

Figure 7A:
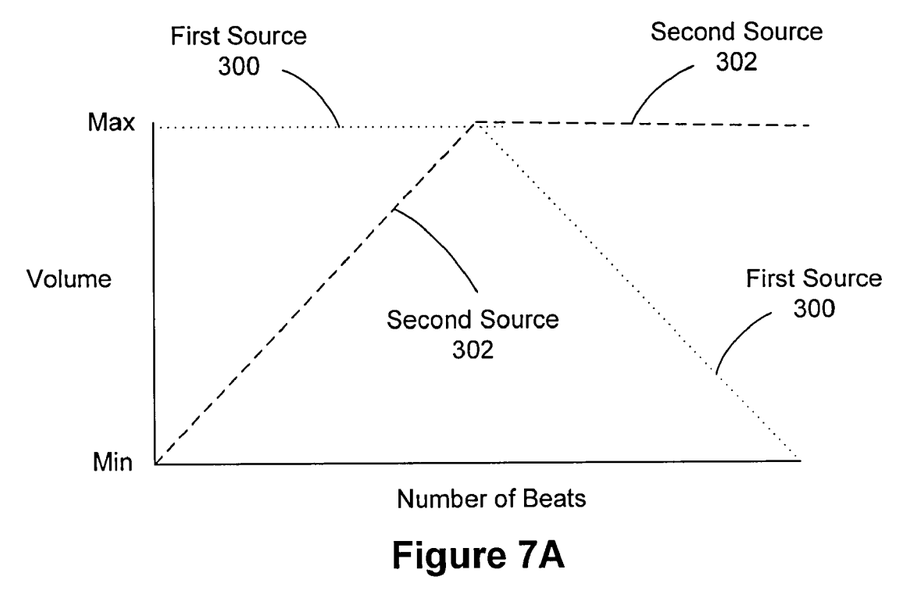
FIGS. 7A, 7B and 7C are exemplary graphs of fading curves based on Volume of the associated sources in accordance with aspects of the technology.
Figure 7B:
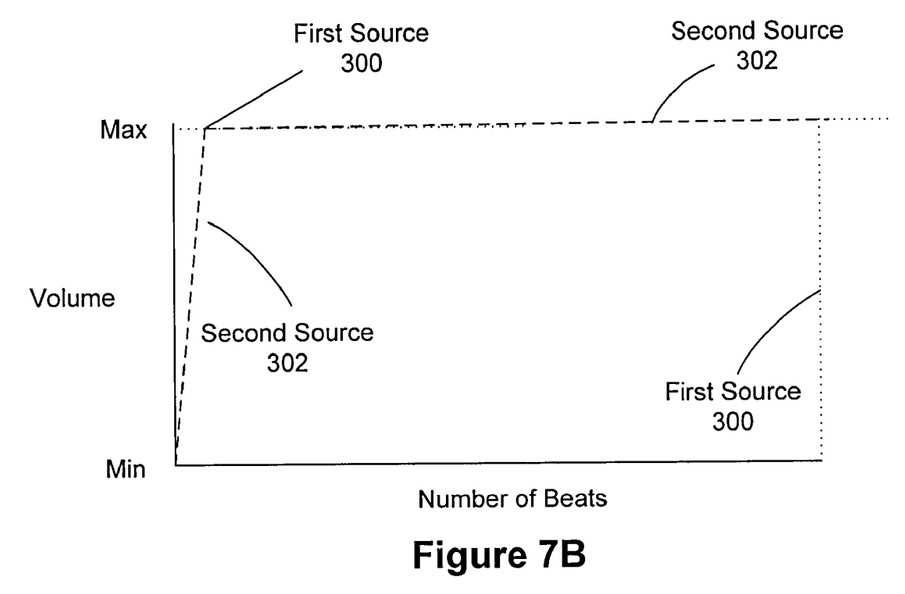
Figure 7C:
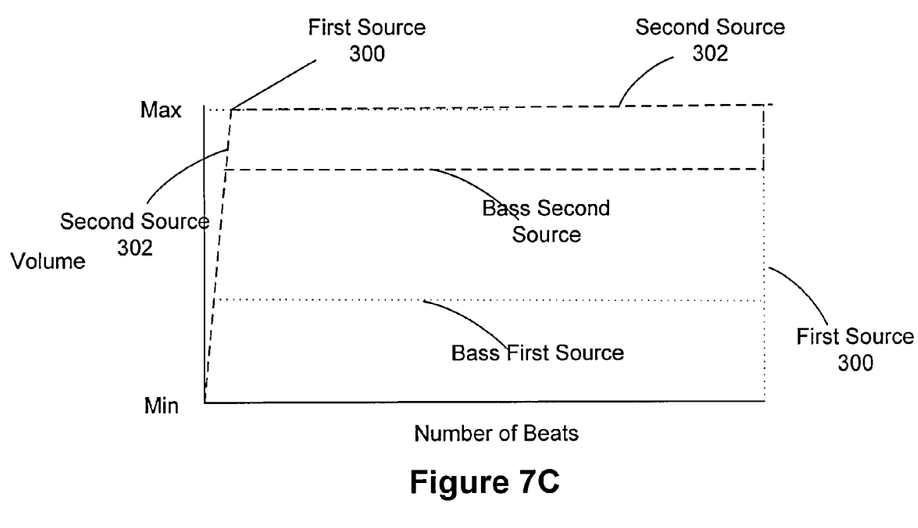

Another fading criterion is main volume cross-fading. For example, when and how the mix should fade over to the new song. Various cross-fade curves for volume are illustrated in FIGS. 7A-7C. Referring to FIG. 7A, once the transition period is reached, the volume associated with the first source remains constant. The volume of the second source increases linearly from a minimum value to reach the volume associated with the first source over substantially one-half of the transition period (number of beats). Once the volume of second source reaches the volume of the first source, the volume of the first source is decreased linearly over the remaining one-half of the transition period.

Referring to FIG. 7B, once the transition period is reached, the volume of the song from the second source is steeply increased. The volume associated with the first source is steeply decreased near the end of the transition period. According to this curve, the volume associated with each of the content sources is played at the same level for a majority of the transition period.

Referring to FIG. 7C, both sources are played at a normal level during the transition period. The level of the second source increases to full almost at the start of the transition period. In order to give the beat mix more characteristics of the second source, the bass level associated with second source is almost at a maximum value whereas the bass level associated with first source is at a substantially lower level. Once the transition period has ended, the bass level associated with the second source is increased to a maximum value and volume associated with the first source is terminated.

Referring to FIG. 3, at block 110, when the sources are beat-matched and a cross-fading curve is selected then a beat mixing area is defined. At block 112, the sources are mixed according to the beat match and the cross-fading curve. At block 114, the player 90 will receive instructions on how to start the beat mix. The instructions may be provided to the player in any desirable form. Generally the instructions are provided from the DJ application 92 to the player 90. The DJ application 92 generally provides the player 90 with run-time information like a start time for beat mixing for song one and two, instruction for how to set the cross-fade during the beat mix and in what tempo/pitch the songs should be played.

If the beat mixing area is not long enough to perform a desirable mix, one or both of the songs can be looped during a certain duration of time. In such a case, the player 90 will receive instructions of which part of the song (start/end-time) that should be looped, how many times it should be looped and the tempo/pitch it should be played in.

In order to further make the mix more interesting to a user, samples from the songs (or from any other suitable source) could be played or otherwise embedded in another song. By giving instruction on how to play the samples, effects like scratching can also be played used mix one or more sources. Different instruction may vary depending a user profile associated with the DJ application 92.

Figure 8:
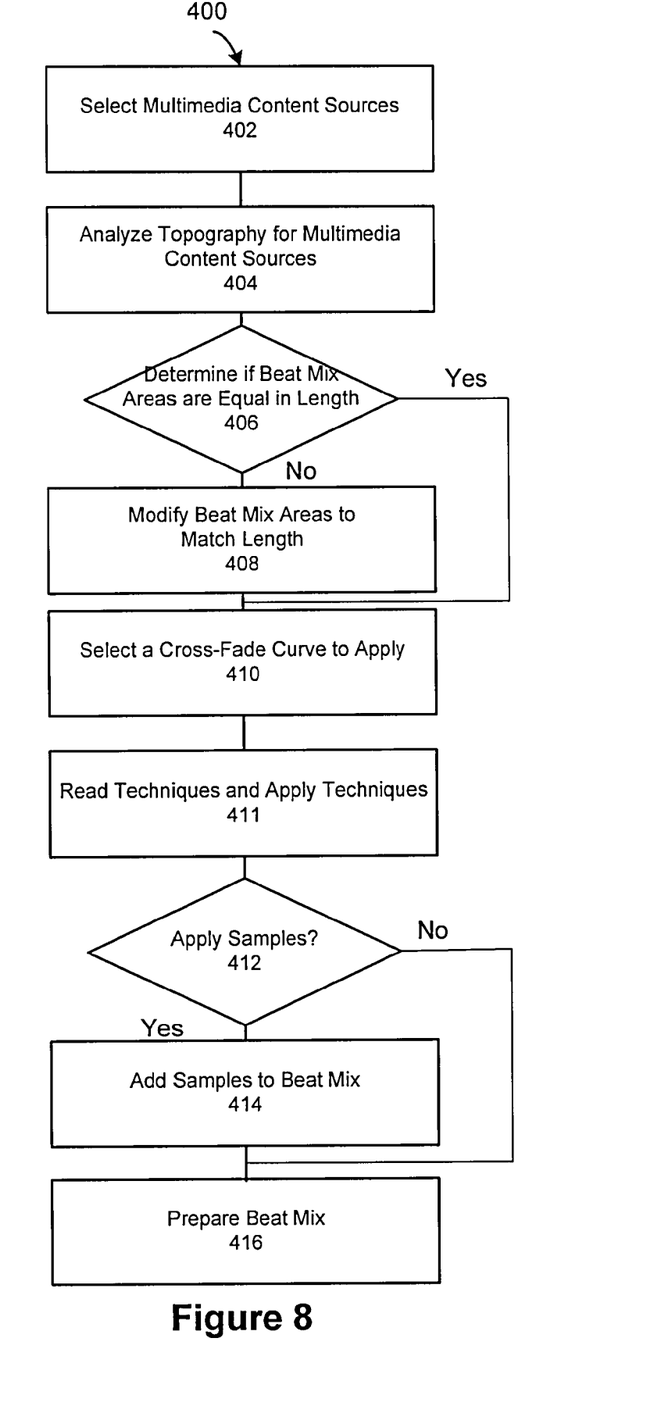
FIGS. 8, 9 and 10 are exemplary methods in accordance with aspects of the technology.

Another method 400 for preparing a beat mix flow is illustrated in FIG. 8. The process starts at block 402. Two sources of multimedia content (e.g., tracks, files, segments of files, etc.) are selected. At block 404, the topography for both sources is analyzed to determine the best area to beat mix the two sources. At block 406, once the beat mixing area is found, a determination is made as to whether the length of the beat mixing area for both sources match in length. If the areas for both sources do not match, flow proceeds to block 408 where the area with the shortest area (e.g., number of beats) is looped to match with the longer area. Another alternative is to shorten the area associated with the longest area. If the areas for both sources match, block 408 is skipped, and the process control proceeds to block 410. At block 410, a cross-fading curve is selected based upon the combined topography of the first and second sources from DJ profile in the DJ application 92. Depending on the sum of the topography, overlapping beats, vocals, etc., adjustments may be needed to be complete a beat mix that the user finds audibly pleasing. For example, an adjustment may be made by selecting a specific cross-fade curve, as illustrated in block 411. A specific cross-fading style can be characteristic for a DJ application and/or the DJ profile may also be involved in the decision making process.

At block 412, a determination is made as whether any additional techniques (or samples) are to be applied during the rendering process. For example, other effects and techniques can also be applied (e.g., simulated scratches, echoes, etc.) instead of (or in addition to) looping a beat can be extended by scratching. At block 414, the samples are applied to the mix. To make the mix more characteristic sounding and also to apply common sounds over a longer period of mixing tracks, a disk jockey sample bank of sources stored in the library 94 may be used. Samples from previous tracks in the playlist of the DJ application 92 and/or the player 90 as well as upcoming songs can also be added. Samples do not necessarily need to be added to the beat mixing area, it can also be applied at any other suitable sections of the tracks. If there are no samples to add, block 414 is skipped and the process control flows to block 416 where the beat mix is prepared for rendering by a suitable player (e.g., player 90).

Figure 9:
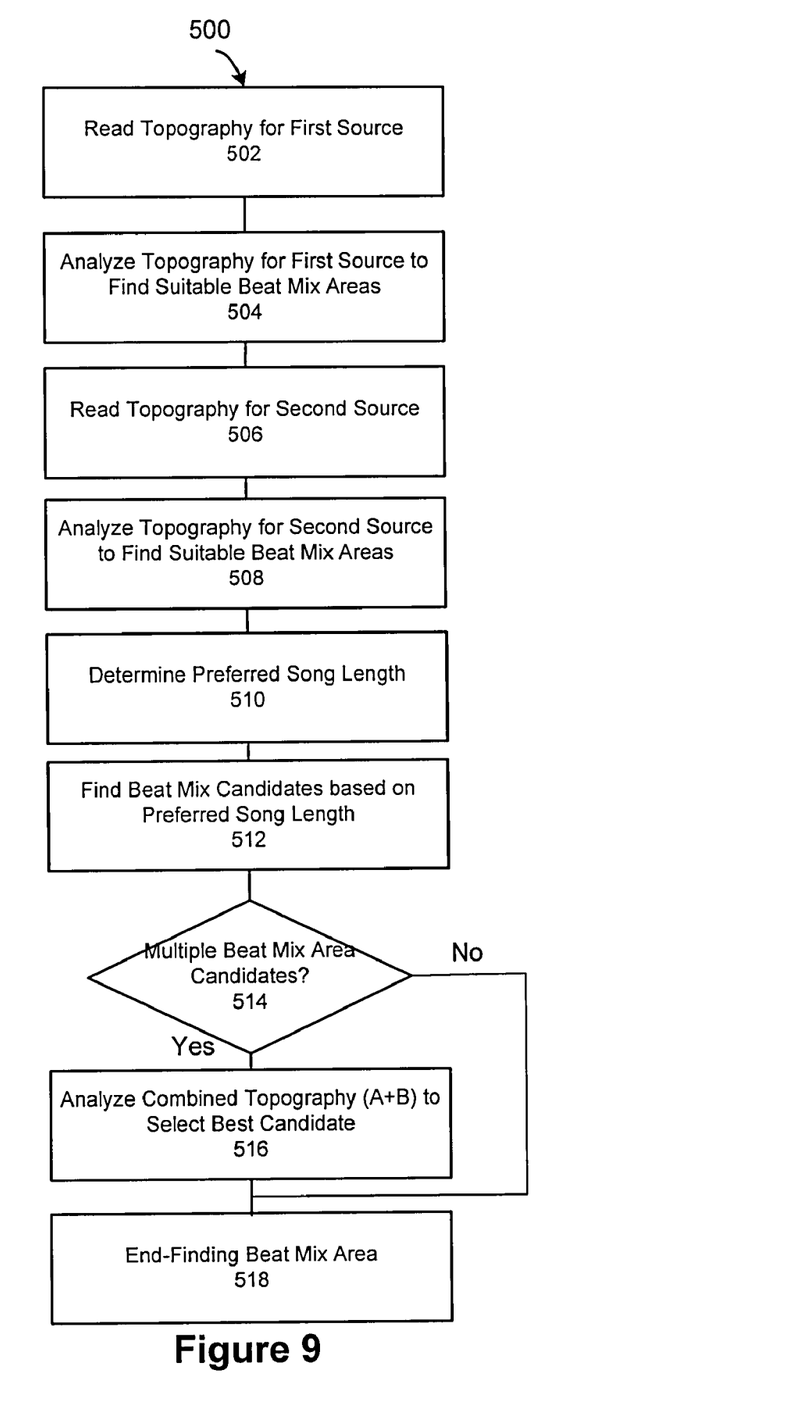

Another method 500 for determining a beat mix area flow is illustrated in FIG. 9. The process starts at block 502 where the topography associated with the first source is read. An exemplary topography includes the following sections: an introduction, verse 1, chorus 1, verse 2, chorus 2, break, chorus 3 and outtro. At step 404, the topography associated with the first source is analyzed to find suitable regions for beat mixing. It may be preferable to play at least one verse and one chorus, but any desired portion of the first source may be selected.

At step 506, the topography associated with the second source is read. An exemplary topography for the second source may be substantially the same as the topography associated with the first source (e.g., an introduction, verse 1, chorus 1, verse 2, chorus 2, break, chorus 3 and outtro). Alternatively, the topography of the second source may vary from the first topography. At step 508, the topography associated with the second source is analyzed to find suitable regions for beat mixing. It may be desirable to play the first verse and the first chorus, but any desired portion of the second source may be selected.

At block 510, the preferred song length is determined for the beat mix. Generally, a profile associated with the DJ application 92 may be read to determine the preferred song length. The profile may store any desired user preferences. For example, the profile may describe the user's preferred ways to play tracks. For instance, the tracks may be: as short as possible (one verse and one chorus), as much of the song as possible, use the areas where the tracks match best (e.g., typically at the break in the first source with the introduction from the second source).

At block 512, beat mix candidates are found based on the preferred song length. For example, assuming the profile is set to "as short as possible", and the possible candidates include: one verse and one chorus from the first source and the intro and one chorus from the second source then possible combinations include: source one chorus and source two intro, source one chorus, source two chorus, source one verse and source two intro, and source one verse and source two intro. A common object is to maintain the music block sequence throughout the mix (e.g., verse to chorus to verse to chorus to break, etc.).

At block 514, a determination is made if there is more than one candidate for the beat mix. If there are more than one candidate, data flow proceeds to block 516 where an analysis of the combined topography (e.g., the sum of the first source+ the second source) is analyzed to select the best candidate and/or a listing of candidates with a beat mix score that may indicate the next best candidates based on one or more factors, as set forth in FIG. 10 discussed below. If there is only one candidate, block 518 is skipped. If there was only one candidate or if one candidate was selected, process flow proceeds to block 518 for termination of the application for finding the beat mixing area.

Figure 10:
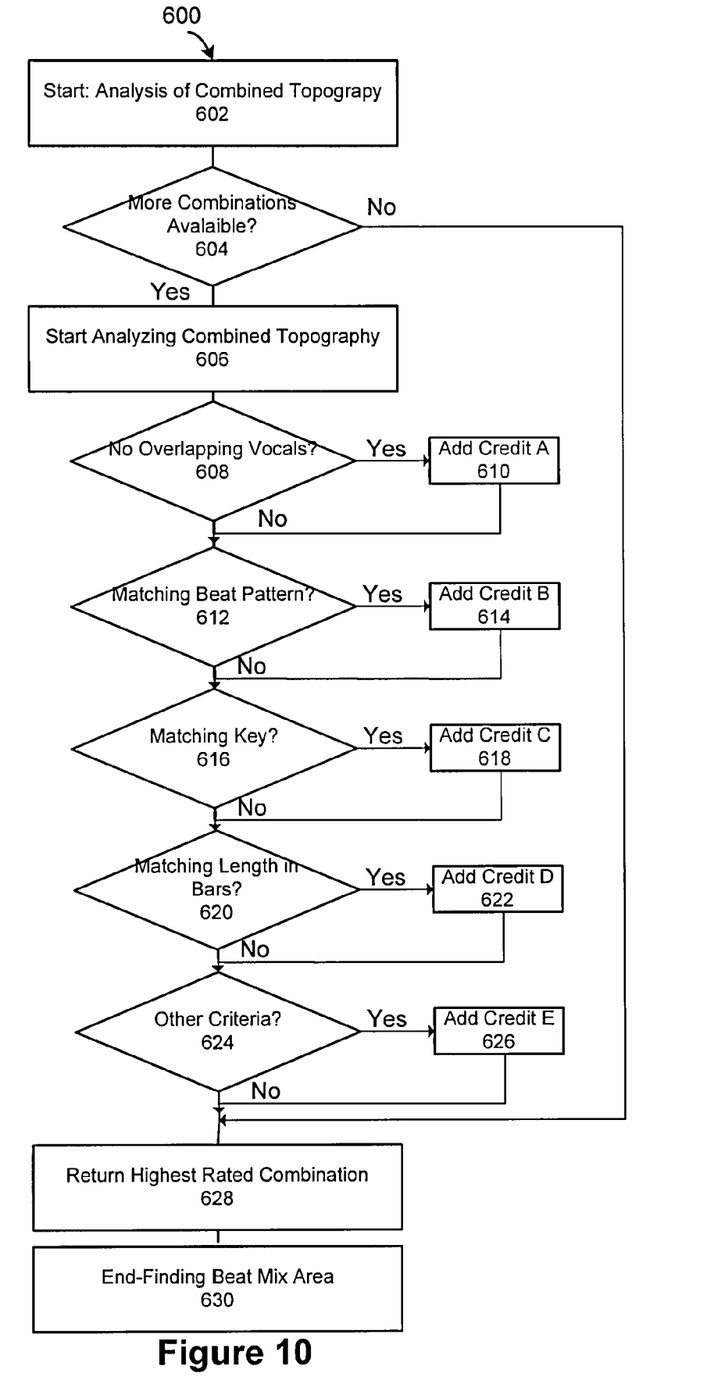

Referring to FIG. 10, an analysis of the combined topography flow is illustrated as method 600. The analysis of the combined topography begins at block 602. At block 604 a determination is made as to whether there are additional combinations of beat mix candidates to analyze. If there are no additional patterns process flow goes to block 628 to return the highest rated combination.

At block 606, the analysis of the combined topography of multiple candidates begins. At block 608, a determination is made as to whether the beat mix candidate has no overlapping vocals. As stated above, it is generally undesirable to have vocals in both tracks overlapping each other when performing a beat mix. If there are no overlapping vocals, a weight (or score) associated with the criteria is assigned to the candidate under evaluation at block 610. The weight may be a predetermined amount and/or a user customizable amount since some parameters may be ranked higher or lower based on a user's preferences. If there are overlapping vocals, no credit is assigned for this parameter and process flows to the next criteria. As one of ordinary skill in the art will readily appreciate, even if there is overlapping vocals in the beat mix candidate under evaluation, a weight (or score) may also be assigned.

At block 612, a determination is made as to whether there is a matching beat pattern in the combined topography. A matching beat pattern makes the transition between the tracks sound seamless to the user. If there is a matching beat pattern in the combined topography, a weight (or score) is assigned to the candidate under evaluation at block 614 and the next parameter may be evaluated. If there are no matching beat patterns, no credit is assigned for this parameter and process flows to the next criteria.

At block 616, a determination is made as to whether there is a matching key in the combined topography. A matching key makes the tracks fit together more smoothly. If there is a matching key in the combined topography, a weight or score is assigned to the candidate under evaluation at block 618 and the next parameter may be evaluated. If there are no matching keys in the beat mix candidate, no credit is assigned for this parameter and process flows to the next criteria.

At block 620, a determination is made as to whether there is a matching length in bars in the combined topography. If the bar length match each other, the mix will be more natural. There will generally be no need for looping, adding of beat samples, etc. if the bar lengths match each other. If there is a matching bar length in the combined topography, a weight or score is assigned to the candidate under evaluation at block 622 and the next parameter may be evaluated. If no matching length in bars is determined, no credit is assigned for this parameter and process flows to the next criteria.

At block 624, a determination is made as to whether any other criteria exists that may make the transition from the first content source to the second content source more acoustically pleasing to the end user or users. One of ordinary skill in the art will readily appreciate that the above listed criteria are exemplary in nature and not meant to limit the scoped of the claims appended hereto and any desirable criteria may be used. If the other criteria are found, a weight or score is assigned to the candidate under evaluation at block 626 and the next parameter may be evaluated, if any. If the other criteria are not matched, no credit is assigned for this parameter and process flows to block 628.

Once each of the criteria is evaluated, at block 628, the highest rated combination is returned based on the above criteria. Alternatively, a listing of the candidates and their relative weight (or score) may also be provided to the user to allow the user to select a candidate. At block 630, the analysis of the combined topography is terminated.

Figure 11:
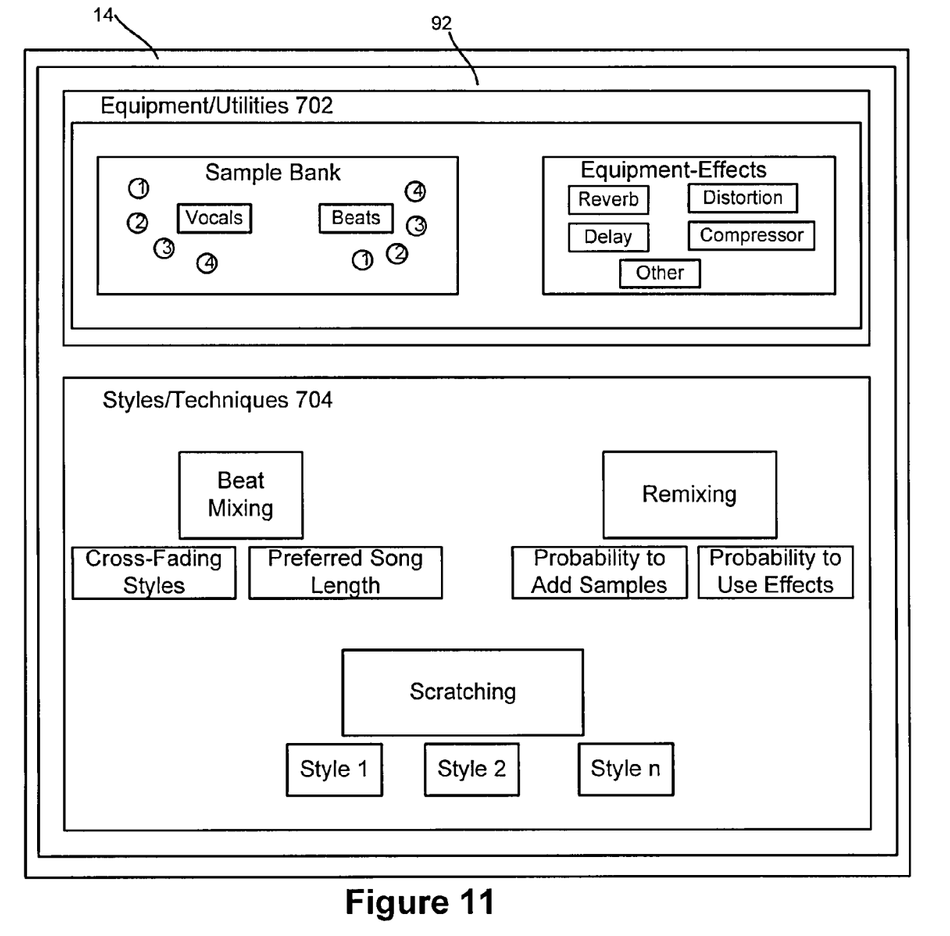
FIG. 11 is an exemplary graphical user interface associated with the disc jockey application in accordance with aspects of the technology.

Referring to FIG. 11, an exemplary GUI for the DJ application 92 is illustrated on display 14. The DJ application 92 may include one or more windows. For example, the DJ application 92 may include an equipment/utilities window 702 and a style/technique window 704. The window 702 may include a listing of sources stored in library 94 and/or in memory 64. The sources may be organized by vocals, beats and/or any other suitable format. In addition, one more equipment effects may also be provided to the user. Such equipment effects may include: reverb, distortion, delay, compressor, and/or any other desirable effect.

The window 704 may include one more styles/techniques. For example, beat mixing, scratching, remixing, etc. In addition, one or more cross-fading styles, preferred song length, styles, probability to add samples, probability to use effects, etc. may be provided to the user. One of ordinary skill in the art will readily appreciate that any one or more of these parameters may be stored in a profile associated with one or more users.

Although the illustrated methods show a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for transitioning from a first multimedia source to a second multimedia content for output to a user, the method comprising:

selecting a first multimedia content source and a second multimedia content source, wherein the first multimedia content source and the second multimedia content source is digitally encoded;

analyzing the first multimedia content source and the second multimedia content source to find at least one candidate from each source to mix together to form a transition between the first multimedia source and the second multimedia source;

selecting at least one candidate from each source;

determine a beat length associated with the selected candidate from each source;

adjusting the beat length of the selected candidate from each source so that the beat length for each candidate is of substantially equal length;

selecting a fade mixing profile by adjusting a volume parameter associated with the selected candidate from each source over a transition period of time;

mixing the selected candidate from each source together according to the fade mixing profile to transition over the transition period time between the first multimedia content source and the second multimedia content source to form a beat mix transition; and rendering the beat mix transition between the first multimedia content source and the second multimedia content source.

2. The method of claim 1, wherein the step analyzing the first and second multimedia content sources to find at least one candidate from each source includes determining a preferred song length for selecting the at least one candidate.

3. The method of claim 1, wherein when at least one of the first or second source include multiple candidates, each candidate from the first source is analyzed with each candidate of the second source.

4. The method of claim 3, wherein a score is determined for each of the multiple candidates based upon the topography of each of the multiple candidates.

5. The method of claim 4, wherein selecting candidate from each source is based upon the score for each of the multiple candidates.

6. The method of claim 1, wherein the step of adjusting the beat length includes truncating the beat length of the at least one candidate from the first or second source having a longer beat length.

7. The method of claim 1, wherein the step of adjusting the beat length includes looping at least a portion of the beat length of the at least one candidate from the first or second source having a shorter beat length.

8. The method of claim 1, wherein the step of analyzing includes determining if there are overlapping vocals for each candidate from each source.

9. The method of claim 8, wherein the step of analyzing includes determining if there is a matching beat pattern exists for each candidate from each source.

10. The method of claim 9, wherein the step of analyzing includes determining if there is a matching key for each candidate from each source.

11. The method of claim 10, wherein the step of analyzing includes determining if there is a matching length in bars for each candidate from each source.

12. The method of claim 1, wherein the step of analyzing includes one or more user customizable parameters to determine a suitable combination of candidates from the first source and the second source.

13. The method of claim 1, wherein a mobile telephone renders the beat mix transition between the first multimedia content source and the second multimedia content source through a speaker.

14. The method of claim 1, wherein the beat mix transition includes one or more effects that simulate a live disc jockey playing conventional records on a turntable.

* * * * *